06. COMPOSITIONS, COATING OR PLASTIC
90

Patented May 25, 1943

2,320,010

UNITED STATES PATENT OFFICE 2,320,010

LIME AND PLASTER PRODUCT AND PROCESS OF PREPARING THE SAME

Anderson W. Ralston and Everett J. Hoffman, Chicago, Ill., assignors to Armour and Company, Chicago, Ill., a corporation of Illinois No Drawing. Original application March 29, 1939, Serial No. 264,850. Divided and this application October 15, 1941, Serial No. 415,140

3 Claims. (Cl. 106—90)

This invention relates to inorganic plastic products and processes of preparing the same, and it comprises inorganic materials, such as limes and plasters, which are commonly admixed with water prior to forming products of permanent shape therefrom, said materials containing, as a plasticity-imparting agent, small amounts of primary aliphatic amines, or salts thereof, containing ten or more carbon atoms. This application is a division of our application Serial No. 264,850 filed March 29, 1939.

It further comprises processes wherein such inorganic materials are admixed with such amines or amine salts, in order to improve the plasticity of such products when admixed with water.

In the manufacture of products from plaster, lime and the like, it is common to first admix these materials with water to form an aqueous mass which can be molded into the desired shape the final article is to take, or to prepare aqueous slurries which can be spread on wall surfaces, roadways, between paper liners in making plaster board, and the like. The aqueous slurries or suspensions of such materials should have good plastic properties. In limes used for plasters, the plaster should retain its water content for considerable periods of time in order to allow the aqueous mixture to be spread evenly and to insure a strong permanent set. The plasticity of such aqueous mixtures appears to be associated in some way with the water-holding capacity of the inorganic constituent.

Limes which are high in magnesium content are superior to high calcium limes as regards plasticity, and here again the high magnesium limes sell at a premium and are in great demand. Such high magnesium limes are suitable for finishing plasters because their aqueous mixtures absorb and retain quite a lot of water but still give mixtures which have the desired workability or plasticity.

The problem is not solved merely by adding more water to the materials. A point is reached where the aqueous slurry becomes thinly fluid and cannot be worked or spread properly.

What is desired is some way of imparting plasticity to inorganic products of the nature specified whereby greater quantities of water are held by the mass yet it has the proper plasticity and workability.

We have now discovered that the plastic properties of such materials can be improved by the addition thereto of small amounts of aliphatic primary amines containing ten or more carbon atoms, or salts of such amines. Typical amines falling within the generic scope of our invention are decylamine, dodecylamine, hexadecyl and octadecylamine, or salts thereof, such as the hydrochloride and acetate. Only small amounts of such amines need be added. Quantities of the order of one-half to 1%, based on the weight of inorganic plastic material, are adequate.

When we apply our invention to limes we measure the amount of water necessary to give the desired consistency and then determine plasticity of the mixture by means of an Emley plasticimeter. For products other than the plasters, the Emley plasticimeter offers a convenient way of measuring plasticity. This apparatus consists of a lower revolving plate and an upper stationary plate. The sample to be tested is placed upon a disc of absorbent ceramic material and inserted between the two plates. The lower plate rotates around a screw so that with each revolution the distance between the lower and the upper plate is decreased. The lower plate is attached by means of a pully arrangement to a needle which indicates the resistance against turning. This scale is divided into ten units and the test is discontinued either when the needle reaches the tenth unit or when it falls back to the zero position. The latter indicates that the sample has separated from the absorbent disc. The time necessary for either of these possibilities to occur is recorded and the plasticity is calculated by means of the following empirical equation:

$$x=\sqrt{(10t)^2+p^2}$$

wherein $x$ equals the plasticity, $t$ equals the time in minutes and $p$ equals ten times the scale reading.

We shall now give examples illustrating our invention:

Example 1

Two and one-half grams of octadecyl amine acetate are added to five hundred grams of a high calcium lime and the mixture admixed with 500 grams of water. The plasticity is then determined by means of the Emley plasticimeter described above and a scale reading of eight recorded after fifteen minutes. This gives a value of 170 for the plasticity. A sample of the same lime and the same amount of water but without the addition of the octadecyl amine acetate gave a value of 139.

Example 2

A sample of a high magnesium lime gives a plasticity value of 190 using the Emley plasticimeter. The addition of one-half of one per cent of dodecyl amine hydrochloride gives a plasticity value of 300 when tested on the plasticimeter.

*Example 3*

A sample of plaster of Paris weighing 200 grams is mixed with water until a workable consistency is obtained. The sample is then poured upon the glass plate and the time necessary for it to set to a hard solid is recorded. The sample requires 92 cc. of water to obtain the desired consistency and sets to a solid in 9 minutes after pouring upon the glass plate.

A similar sample is mixed with 0.5% by weight of dodecyl amine acetate. This sample is then mixed with water as described above, poured upon the glass plate and the time necessary for it to set recorded. This sample requires 106 cc. of water and sets to a hard solid in 49 minutes.

A similar sample of plaster of Paris is mixed with 0.25% of dodecyl amine acetate and treated as above described. This sample requires 103 cc. of water to obtain the desired consistency and requires 42 minutes to set to a hard solid.

A similar sample of plaster of Paris is mixed with 0.1% of dodecyl amine acetate and treated as decribed above. This sample requires 98 cc. of water and sets to a hard solid in 40 minutes.

A similar sample of plaster of Paris is mixed with 0.5 of 1% of dodecyl amine. This sample requires 110 cc. of water to reach the desired consistency and sets to a hard solid in 48 minutes.

In order to compare the water holding capacity of the plaster of Paris-amine or amine salt mixtures with similar mixtures made without the addition of amines or amine salts, a sample of plaster of Paris weighing 200 grams is treated with 106 cc. of water which is the same amount necessary to impart a workable consistency to a sample containing one-half of 1% of dodecyl amine acetate. The mixture forms a soupy mass which is too liquid to be workable. It can be readily poured from the beaker whereas all of the other samples described above are semi-solids when poured onto the glass plate. The conclusion, therefore, is that the addition of the dodecyl amine or the dodecyl amine acetate has materially increased the plastic range, water holding capacity, and the time of setting of the plaster of Paris samples.

In the practice of our invention the manner of incorporating the amine or amine salt in the plastic material depends on the nature of the substance to which it is added. When slake lime is used the amine salt can either be mixed with the dry lime or dissolved in the slaking water and then be admixed with the lime.

Although we have limited our specific examples to the use of dodecyl amine or dodecyl amine salts, and to octadecyl amine salts it will be apparent that similar results are obtained when other amine or amine salts having ten or more carbon atoms are used. In many instances when we add the amine salt it reacts with alkaline constituents in the lime to liberate free amine and in consequence, the water holding capacity in such instances is due to the presence of the amine rather than the amine salt. But both the amines and their salts are equally useful in our process. As a matter of convenience the amine salts are preferred but the amines themselves are operable to an equal extent.

The actual amount of amine or amine salt present can vary over wide limits, but one-half of 1% or thereabouts is almost always adequate. More than one-half of 1% is not ordinarily necessary to impart the desired plasticity to the final aqueous mixture.

Having thus described our invention, what we claim is:

1. The process of improving the plasticity of aqueous mixtures prepared from inorganic solids chosen from the group consisting of lime and plaster of Paris, and like cementitious materials which includes the step of incorporating therewith small amounts of a primary aliphatic amine compound chosen from the group consisting of primary aliphatic amines and salts thereof having at least ten carbon atoms in the alkyl radical.

2. The process as in claim 1 wherein the amine compound is a dodecylamine salt.

3. Plaster compositions containing a primary aliphatic amine, or salt thereof, having at least ten carbon atoms.

ANDERSON W. RALSTON.
EVERETT J. HOFFMAN.